J. C. MULLINS, Jr.
TRANSMISSION FOR THE PROPELLER SHAFTS OF AEROPLANES.
APPLICATION FILED SEPT. 24, 1919.
1,369,044.
Patented Feb. 22, 1921.
2 SHEETS—SHEET 1.
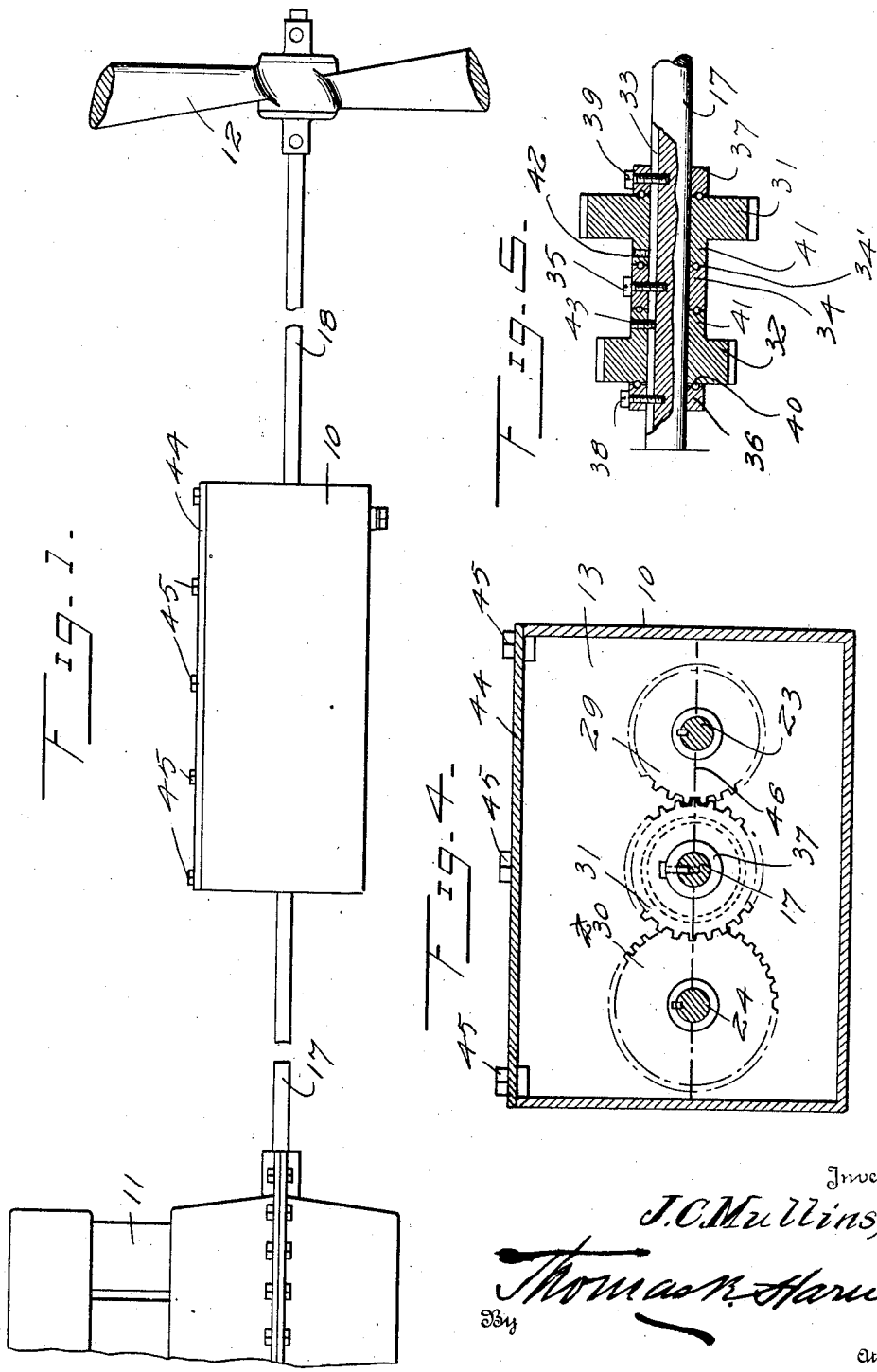
Inventor
J. C. Mullins, Jr.
By Thomas R. Harner
Attorney J. C. MULLINS, Jr.
TRANSMISSION FOR THE PROPELLER SHAFTS OF AEROPLANES.
APPLICATION FILED SEPT. 24, 1919.
1,369,044.
Patented Feb. 22, 1921.
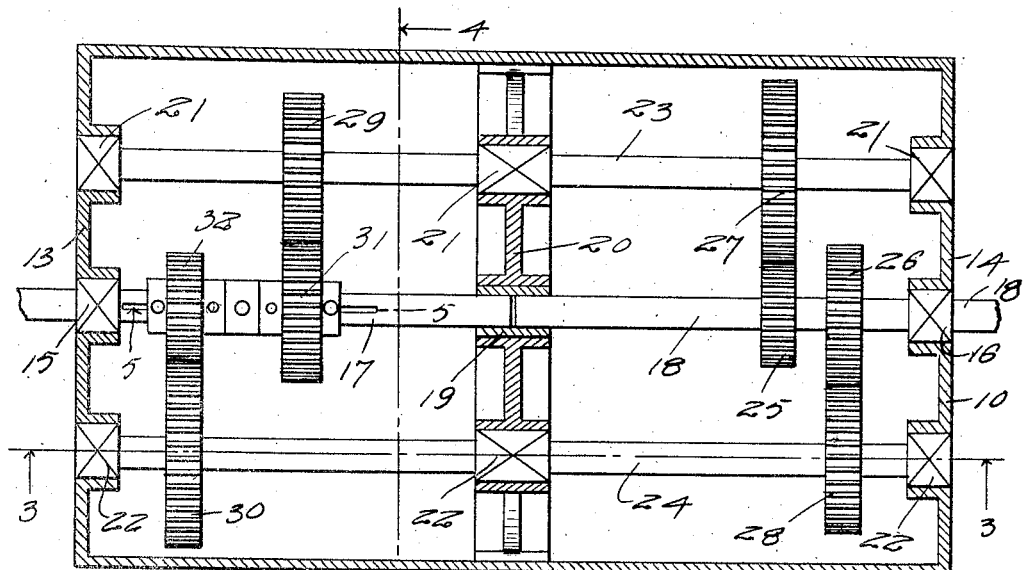
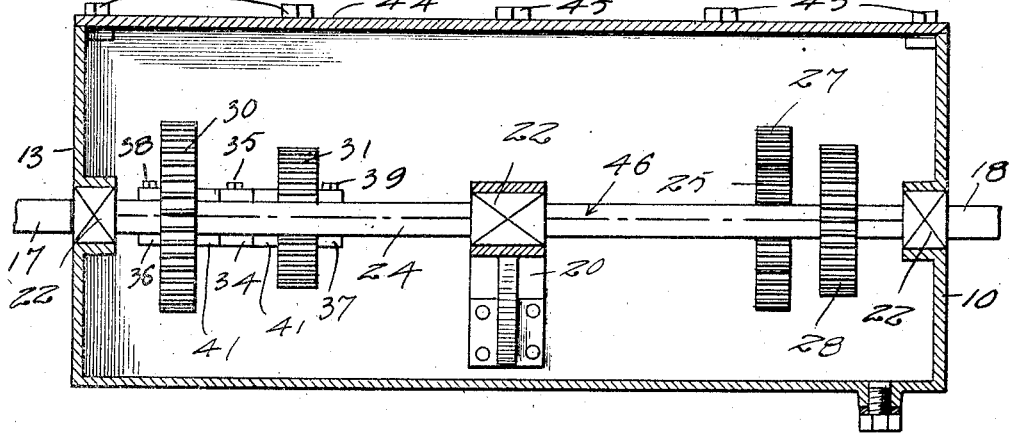

UNITED STATES PATENT OFFICE.

JOHN C. MULLINS, JR., OF COEBURN, VIRGINIA, ASSIGNOR, BY DIRECT AND MESNE ASSIGNMENTS, OF ONE-EIGHTH TO BENJAMIN F. HILLMAN, OF FLATWOODS, VIRGINIA, AND ONE-EIGHTH TO JOEL H. BEVERLEY, ONE-FOURTH TO SAMUEL P. BUCHANAN, ONE-SIXTEENTH TO CLINTON M. WOLFE, ONE-SIXTEENTH TO CYRUS M. T. HOLBROOK, AND ONE-EIGHTH TO WILLIAM E. COX, ALL OF COEBURN, VIRGINIA.

TRANSMISSION FOR THE PROPELLER-SHAFTS OF AEROPLANES.

1,369,044.   Specification of Letters Patent.   Patented Feb. 22, 1921.

Application filed September 24, 1919. Serial No. 325,916.

*To all whom it may concern:*

Be it known that I, JOHN C. MULLINS, Jr., a citizen of the United States, and a resident of Coeburn, in the county of Wise and State of Virginia, have invented certain new and useful Improvements in Transmissions for the Propeller-Shafts of Aeroplanes, of which the following is a specification.

My present invention relates generally to aeroplanes and more particularly to a transmission mechanism whereby the speed of rotation of the propeller may be increased or decreased with respect to that of the motor, my object being the provision of a simple, compact mechanism capable of ready installation within the forepart of the fuselage of an aeroplane and one so constructed that the gears and moving parts may run in oil.

In the accompanying drawings which illustrate the preferred form of my invention, Figure 1 is a side view, illustrating the practical application of my invention, Fig. 2 is a horizontal section taken through the mechanism in the plane of the propeller shaft, Fig. 3 is a vertical longitudinal section taken substantially on line 3—3 of Fig. 2, Fig. 4 is a vertical transverse section taken substantially on line 4—4 of Fig. 2, and Fig. 5 is a detail section taken substantially on line 5—5 of Fig. 2.

Referring now to these figures, my present invention proposes a substantially rectangular box like casing 10, whose shape lends itself to ready installation and secure connection within the forepart of an aeroplane fuselage between its motor 11 and its propeller 12. In its end walls 13 and 14 the casing 10 has centrally disposed bearings 15 and 16 respectively for the motor shaft 17 and propeller shaft 18 which extend into the casing in axially alined relation with their inner ends terminating in a bearing 19 centrally between the end walls 13 and 14, as best seen in Fig. 2.

The end walls 13 and 14 and the central bearing support 20 also have bearings 21 and 22 respectively for a pair of transmission shafts 23 and 24 disposed in the casing 10 in spaced parallel relation to the shafts 17 and 18 and upon relatively opposite sides thereof and in approximately the same horizontal plane therewith. At one side of the central bearing support 20, the propeller shaft 18 has longitudinally spaced small and large gears 25 and 26 securely fastened thereon in lengthwise spaced relation and respectively in engagement with gears 27 and 28 securely fastened upon the transmission shafts 23 and 24.

Upon the relatively opposite side of the central bearing support 20, the transmission shafts 23 and 24 have small and large gears 29 and 30 respectively engaged by gears 31 and 32 of the motor shaft 17 and which are mounted and controlled as will be now described in connection with Fig. 5 in particular.

As seen in Fig. 5, the motor shaft 17 has a longitudinal key way 33 and the gears 31 and 32 are rotatably mounted on this portion of the shaft, upon relatively opposite sides of a bearing collar 34 secured to the shaft 17, by machine screws 35 or through similar fastenings, and between collars 36 and 37, also secured to the shaft 17 by machine screws and the like 38 and 39. The collars 34, 36 and 37 and the sides of the gears 31 and 32 preferably engage with antifriction bearings 40, and each of the gears 31 and 32 has a hub portion 41 provided with a threaded opening 42 for the reception of a set screw 43 which when in position within the threaded opening 42 extends at its inner end into the key-way 33 and thus connects the gear with the shaft.

It is of course obvious that in operation only one of the gears 31 and 32 will be connected to rotate with the shaft 17, the set screw 43 being set into the hub portion of the gear 31 upon removal from gear 32, so that the rotation of shaft 17 will be transmitted through gears 31 and 29, transmission shaft 23, and gears 25 and 27, to propeller shaft 18. In this event, it is seen that as gears 29 and 31 are similar in size and gear 27 is of greater size than gear 25, the rotation of the propeller shaft 18 will be increased with respect to that of the motor shaft 17.

On the other hand, if the gear 31 is released by withdrawing the set screw and the gear 32 connected by placement of the set screw therein, rotation will be transmitted through gears 32 and 30, transmission shaft 24, and gears 28 and 26 to the propeller shaft 18. In this event, it will be noted that as the gear 32 is much smaller than gear 30 and the gears 28 and 36 are of the same size, speed of rotation of the propeller shaft 18 will be decreased with respect to that of the motor shaft.

The casing 10 is preferably open at its upper end where it is closed under normal conditions by means of a cover 44 secured thereto by machine screws and the like 45, so that the cover may be readily removed to make the gear change, above described, when it becomes desirable to do so.

The construction of the parts, and the casing 10 of the type described, provides for the running of the gears and shaft bearings in oil within the casing, the level of which is preferably at the center of the several shafts 17, 18, 23 and 24, or in other words at the broken line 46 in Figs. 3 and 4.

I claim:—

The combination with the motor and propeller shafts of an aerial motor driven machine, of a casing forming an oil receptacle, and having a transverse partition intermediate its ends in which the adjacent ends of said shafts are journaled in axially alined relation, gears carried by the said shafts and of which the gears of the motor shaft are provided with hub portions and are revolubly disposed on the shaft, set collars secured on the motor shaft and between which the gears thereof are disposed for rotation, said motor shaft having a key way and said gear hubs having threaded openings, set screws for engagement through said threaded openings to project into the key way of the shaft, transmission shafts parallel with the motor and propeller shafts and gears secured on the transmission shafts and permanently in engagement with the gears of the motor and propeller shaft, said gears being equi-distantly spaced upon opposite sides of the said partition and thus maintaining permanently balanced relation by virtue of their non-shiftable relation, as and for the purpose set forth.

In testimony whereof I affix my signature.

JOHN C. MULLINS, Jr.